(12) United States Patent
Baek et al.

(10) Patent No.: US 11,284,302 B2
(45) Date of Patent: Mar. 22, 2022

(54) APPARATUS AND METHOD FOR PROVIDING SERVICE IN WIRELESS COMMUNICATION SYSTEM

(71) Applicant: Samsung Electronics Co., Ltd., Suwon-si (KR)

(72) Inventors: Sangkyu Baek, Suwon-si (KR); Hyunjeong Kang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/054,503

(22) PCT Filed: May 9, 2019

(86) PCT No.: PCT/KR2019/005525
§ 371 (c)(1),
(2) Date: Nov. 10, 2020

(87) PCT Pub. No.: WO2019/216652
PCT Pub. Date: Nov. 14, 2019

(65) Prior Publication Data
US 2021/0195466 A1    Jun. 24, 2021

(30) Foreign Application Priority Data
May 10, 2018  (KR) .................. 10-2018-0053872

(51) Int. Cl.
*H04W 28/02* (2009.01)
*H04W 28/12* (2009.01)

(52) U.S. Cl.
CPC ....... *H04W 28/12* (2013.01); *H04W 28/0278* (2013.01)

(58) Field of Classification Search
CPC ......... H04W 28/0268; H04W 28/0278; H04W 28/12; H04W 28/02
See application file for complete search history.

(56) References Cited

U.S. PATENT DOCUMENTS

| 10,405,327 | B2 * | 9/2019 | Loehr | H04W 28/0278 |
| 2015/0003371 | A1 * | 1/2015 | Park | H04W 52/365 370/329 |

(Continued)

FOREIGN PATENT DOCUMENTS

| KR | 10-2018-0136898 A | 12/2018 |
| KR | 10-2019-0098651 A | 8/2019 |
| WO | 2017/172449 A1 | 10/2017 |

OTHER PUBLICATIONS

"3rd Generation Partnership Project; Technical Specification Group Radio Access Network; Evolved Universal Terrestrial Radio Access (E-UTRA); Medium Access Control (MAC) protocol specification (Release 15)", 3GPP TS 36.321 V15.1.0 (Mar. 2018), 109 pages.

(Continued)

*Primary Examiner* — Nathan S Taylor

(57) ABSTRACT

The present disclosure relates to a 5th generation (5G) or pre-5G communication system for supporting a data transmission rate higher than that of a 4th generation (4G) communication system such as long term evolution (LTE). The present disclosure relates to service provision in a wireless communication system, and an operating method of a terminal in the wireless communication system, may include receiving a first message including a first value from a first base station which provides a first connection for dual connectivity, receiving a second message including a second value from a second base station which provides a second connection for the dual connectivity, and determining a bit rate based on the first value and the second value.

11 Claims, 17 Drawing Sheets

(56) References Cited

U.S. PATENT DOCUMENTS

| | | | | |
|---|---|---|---|---|
| 2015/0117342 | A1* | 4/2015 | Loehr | H04W 72/1284 370/329 |
| 2015/0215945 | A1 | 7/2015 | Hsu et al. | |
| 2015/0245349 | A1* | 8/2015 | Jha | H04W 28/0278 370/329 |
| 2015/0334737 | A1* | 11/2015 | Susitaival | H04W 24/02 370/329 |
| 2016/0029245 | A1* | 1/2016 | Hong | H04W 28/0278 370/329 |
| 2016/0255551 | A1* | 9/2016 | Susitaival | H04W 16/32 370/334 |
| 2016/0337909 | A1* | 11/2016 | Cai | H04W 72/1284 |
| 2017/0013640 | A1* | 1/2017 | Loehr | H04W 76/14 |
| 2017/0064534 | A1* | 3/2017 | Loehr | H04W 72/1268 |
| 2017/0086093 | A1* | 3/2017 | Chen | H04W 28/0278 |
| 2017/0142741 | A1* | 5/2017 | Kaur | H04W 76/14 |
| 2017/0257876 | A1* | 9/2017 | Loehr | H04W 28/0278 |
| 2017/0310531 | A1* | 10/2017 | Dinan | H04L 27/32 |
| 2017/0311317 | A1* | 10/2017 | Dinan | H04W 72/0486 |
| 2017/0318606 | A1* | 11/2017 | Lee | H04W 28/0278 |
| 2017/0332275 | A1* | 11/2017 | Yi | H04W 72/1284 |
| 2018/0014322 | A1* | 1/2018 | Loehr | H04W 52/0206 |
| 2018/0041410 | A1* | 2/2018 | Yi | H04W 28/0278 |
| 2018/0069618 | A1* | 3/2018 | Loehr | H04W 72/1263 |
| 2018/0102871 | A1 | 4/2018 | Wu | |
| 2018/0176937 | A1* | 6/2018 | Chen | H04W 74/085 |
| 2018/0317123 | A1* | 11/2018 | Chen | H04W 28/0278 |
| 2018/0367288 | A1* | 12/2018 | Vrzic | H04W 36/0069 |
| 2019/0021109 | A1* | 1/2019 | Yi | H04W 72/14 |
| 2019/0215717 | A1* | 7/2019 | Lee | H04W 80/08 |
| 2019/0254115 | A1 | 8/2019 | Baek et al. | |
| 2019/0268799 | A1* | 8/2019 | Hong | H04W 28/0278 |
| 2020/0022106 | A1* | 1/2020 | Kim | H04W 16/28 |
| 2020/0029379 | A1* | 1/2020 | Xiao | H04L 1/22 |
| 2020/0077293 | A1* | 3/2020 | Lee | H04W 72/1284 |
| 2020/0120569 | A1 | 4/2020 | Baek et al. | |
| 2020/0229026 | A1* | 7/2020 | Parron | H04W 28/06 |
| 2020/0275376 | A1* | 8/2020 | Lee | H04L 1/1812 |

OTHER PUBLICATIONS

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.1.0 (Mar. 2018), 341 pages.

International Search Report dated Oct. 15, 2019 in connection with International Patent Application No. PCT/KR2019/005525, 2 pages.

Written Opinion of the International Searching Authority dated Oct. 15, 2019 in connection with International Patent Application No. PCT/KR2019/005525, 6 pages.

\* cited by examiner

APPARATUS AND METHOD FOR PROVIDING SERVICE IN WIRELESS COMMUNICATION SYSTEM

CROSS-REFERENCE TO RELATED APPLICATION

This application is a 371 of International Application No. PCT/KR2019/005525 filed on May 9, 2019, which claims priority to Korean Patent Application No. 10-2018-0053872 filed on May 10, 2018, the disclosures of which are herein incorporated by reference in their entirety.

BACKGROUND

1. Field

The present disclosure relates generally to a wireless communication system, and more particularly, to an apparatus and a method for providing a service in the wireless communication system.

2. Description of Related Art

To satisfy a wireless data traffic demand which is growing after a 4th generation (4G) communication system is commercialized, efforts are exerted to develop an advanced 5th generation (5G) communication system or a pre-5G communication system. For this reason, the 5G communication system or the pre-5G communication system is referred to as a beyond 4G network communication system or a post long term evolution (LTE) system.

To achieve a high data rate, the 5G communication system considers its realization in an extremely high frequency (mmWave) band (e.g., 28 GHz or 60 GHz band). To mitigate a path loss of propagation and to extend a propagation distance in the extremely high frequency band, the 5G communication system is discussing beamforming, massive multiple input multiple output (MIMO), full dimensional (FD)-MIMO, array antenna, analog beam-forming, and large scale antenna techniques.

Also, for network enhancement of the system, the 5G communication system is developing techniques such as evolved small cell, advanced small cell, cloud radio access network (RAN), ultra-dense network, device to device (D2D) communication, wireless backhaul, moving network, cooperative communication, coordinated multi-points (CoMP), and receive interference cancellation.

Besides, the 5G system is working on hybrid frequency shift keying and quadrature amplitude modulation (FOAM) and sliding window superposition coding (SWSC) as advanced coding modulation (ACM) schemes, and filter bank multi carrier (FBMC), non orthogonal multiple access (NOMA), and sparse code multiple access (SCMA) as advanced access technologies.

Based on the discussions described above, the present disclosure provides an apparatus and a method for performing bit rate recommendation per quality of service (QoS) flow in a wireless communication system.

Also, the present disclosure provides an apparatus and a method for performing bit rate recommendation in a dual connectivity environment in a wireless communication system.

Also, the present disclosure provides an apparatus and a method for managing transmission of a corresponding link if retransmission reaches the maximum number of retransmissions in a wireless communication system.

SUMMARY

According to various embodiments of the present disclosure, an operating method of a terminal in a wireless communication system, may include receiving a first message including a first value from a first base station which provides a first connection for dual connectivity, receiving a second message including a second value from a second base station which provides a second connection for the dual connectivity, and determining a bit rate based on the first value and the second value.

According to various embodiments of the present disclosure, an operating method of a terminal in a wireless communication system, may include identifying a first buffer size for a first logical channel (LCH), identifying a second buffer size for a second LCH, and transmitting a buffer status report including a first value corresponding to the first buffer size and a second value corresponding to the second buffer size.

According to various embodiments of the present disclosure, an apparatus of a terminal in a wireless communication system, may include a transceiver, and at least one processor connected to the transceiver, wherein the transceiver may receive a first message including a first value from a first base station which provides a first connection for dual connectivity, receive a second message including a second value from a second base station which provides a second connection for the dual connectivity, and determine a bit rate based on the first value and the second value.

According to various embodiments of the present disclosure, an apparatus of a terminal in a wireless communication system, may include a transceiver, and at least one processor connected to the transceiver, wherein the at least one processor may identify a first buffer size for a first LCH, identify a second buffer size for a second LCH, and control to transmit a buffer status report which including a first value corresponding to the first buffer size and a second value corresponding to the second buffer size.

An apparatus and a method according to various embodiments of the present disclosure, may apply a bit rate optimized for communication of specific traffic. In addition, an apparatus and a method according to various embodiments of the present disclosure, may prevent unnecessary retransmission of a link of which retransmission reaches the maximum number of retransmissions.

Effects obtainable from the present disclosure are not limited to the above-mentioned effects, and other effects which are not mentioned may be clearly understood by those skilled in the art of the present disclosure through the following descriptions.

DETAILED DESCRIPTION

Terms used in the present disclosure are used for describing particular embodiments and are not intended to limit the scope of other embodiments. A singular form may include a plurality of forms unless it is explicitly differently represented. All the terms used herein, including technical and scientific terms, may have the same meanings as terms generally understood by those skilled in the art to which the present disclosure pertains. Among terms used in the present disclosure, the terms defined in a general dictionary may be interpreted to have the same or similar meanings with the context of the relevant art, and, unless explicitly defined in this disclosure, it shall not be interpreted ideally or excessively as formal meanings. In some cases, even terms defined in this disclosure should not be interpreted to exclude the embodiments of the present disclosure.

In various embodiments of the present disclosure to be described below, a hardware approach will be described as an example. However, since the various embodiments of the present disclosure include a technology using both hardware and software, the various embodiments of the present disclosure do not exclude a software-based approach.

Hereafter, the present disclosure relates to an apparatus and a method for providing a service in a wireless communication system.

Terms indicating signals, terms indicating channels, terms indicating control information, terms indicating network entities, and terms indicating components of an apparatus, which are used in the following descriptions, are for the sake of explanations. Accordingly, the present disclosure is not limited to the terms to be described, and may use other terms having technically identical meaning.

In addition, the present disclosure describes various embodiments using terms used in some communication standards (e.g., $3^{rd}$ generation partnership project (3GPP)), which are merely exemplary for explanations. Various embodiments of the present disclosure may be easily modified and applied in other communication systems.

Figure 1:
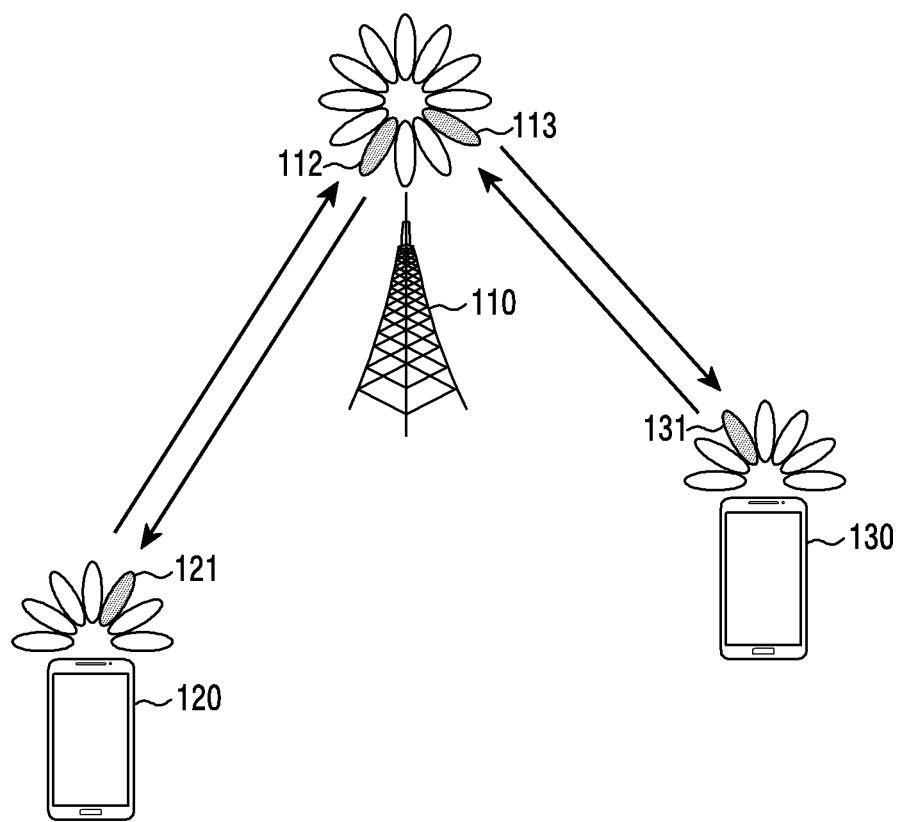
FIG. 1 illustrates a wireless communication system according to various embodiments of the present disclosure.

FIG. 1 illustrates a wireless communication system according to various embodiments of the present disclosure. FIG. 1 depicts a base station 110, a terminal 120, and a terminal 130, as some of nodes which use a radio channel in the wireless communication system. While FIG. 1 depicts only one base station, other base station which is identical or similar to the base station 110 may be further included.

The base station 110 is a network infrastructure for providing radio access to the terminals 120 and 130. The base station 110 has coverage defined as a specific geographical area based on a signal transmission distance. The base station 110 may be referred to as, besides the base station, an 'access point (AP)', an 'eNodeB (eNB)', a '5th generation node (5G node)', a 'wireless point', a 'transmission/reception point (TRP)', or other terms having technically identical meaning.

The terminal 120 and the terminal 130 each are a device used by a user, and communicate with the base station 110 over a radio channel. In some cases, at least one of the terminal 120 and the terminal 130 may operate without user's involvement. That is, at least one of the terminal 120 and the terminal 130 is a device which performs machine type communication (MTC), and may not be carried by the user. The terminal 120 and the terminal 130 each may be referred to as, besides the terminal, a 'user equipment (UE)', a 'mobile station', a 'subscriber station', a 'remote terminal', a 'wireless terminal', or a 'user device', or other term having a technically equivalent meaning.

The base station 110, the terminal 120, and the terminal 130 may transmit and receive radio signals in a millimeter wave (mmWave) band (e.g., 28 GHz, 30 GHz, 38 GHz, 60 GHz). In so doing, to improve channel gain, the base station 110, the terminal 120, and the terminal 130 may conduct beamforming. Herein, the beamforming may include transmit beamforming and receive beamforming. That is, the base station 110, the terminal 120, and the terminal 130 may apply directivity to a transmit signal or a received signal. For doing so, the base station 110 and the terminals 120 and 130 may select serving beams 112, 113, 121, and 131 through a beam search or beam management procedure. After the serving beams 112, 113, 121, and 131 are selected, communications may be performed using resources which are quasi co-located (QCL) with resources which carry the serving beams 112, 113, 121, and 131.

If large-scale properties of a channel which carries a symbol on a first antenna port may be inferred from a channel which carries a symbol on a second antenna port, the first antenna port and the second antenna port may be estimated to be QCL. For example, the large-scale properties may include at least one of delay spread, Doppler spread, Doppler shift, average gain, average delay, and spatial receiver parameter.

Figure 2:
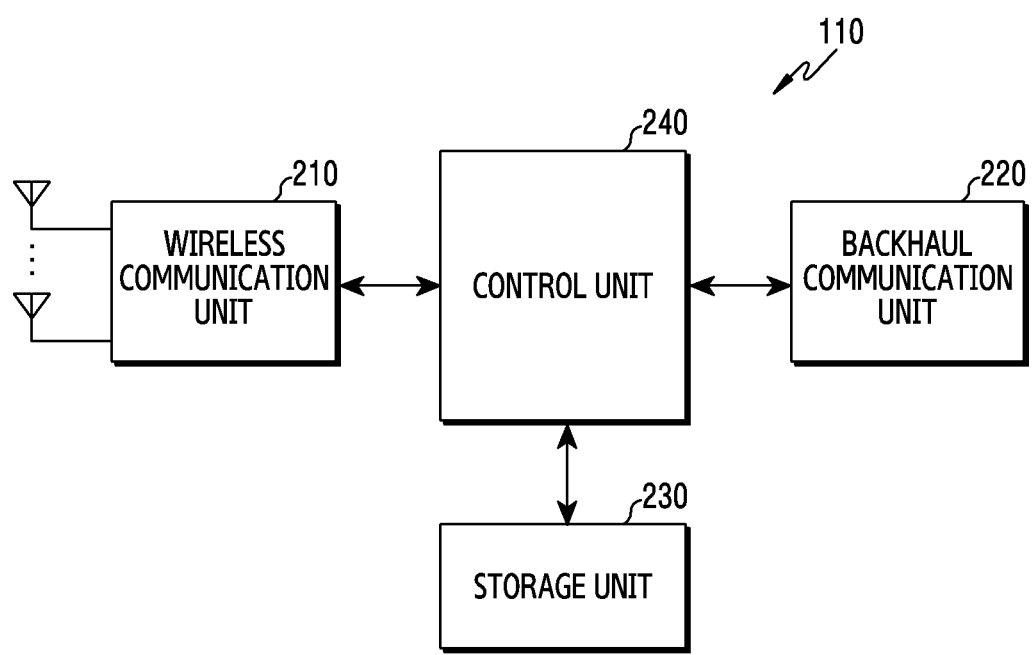
FIG. 2 illustrates a configuration of a base station in a wireless communication system according to various embodiments of the present disclosure.

FIG. 2 illustrates a configuration of a base station in a wireless communication system according to various embodiments of the present disclosure. The configuration in FIG. 2 may be understood as the configuration of the base station 110. A term such as 'portion' or '~er' used hereafter indicates a unit for processing at least one function or operation, and may be implemented using hardware, software, or a combination of hardware and software.

Referring to FIG. 2, the base station includes a wireless communication unit 210, a backhaul communication unit 220, a storage unit 230, and a control unit 240.

The wireless communication unit 210 may perform functions for transmitting and receiving signals over a radio channel. For example, the wireless communication unit 210 performs a conversion function between a baseband signal and a bit string according to a physical layer standard of the system. For example, in data transmission, the wireless communication unit 210 generates complex symbols by encoding and modulating a transmit bit string. Also, in data reception, the wireless communication unit 210 restores a receive bit string by demodulating and decoding a baseband signal.

Also, the wireless communication unit 210 up-converts the baseband signal to a radio frequency (RF) band signal, transmits it via an antenna, and down-converts an RF band signal received via an antenna to a baseband signal. For doing so, the wireless communication unit 210 may include a transmit filter, a receive filter, an amplifier, a mixer, an oscillator, a digital to analog convertor (DAC), an analog to digital convertor (ADC), and so on. In addition, the wireless communication unit 210 may include a plurality of transmit and receive paths. Further, the wireless communication unit 210 may include at least one antenna array including a plurality of antenna elements.

In terms of the hardware, the wireless communication unit 210 may include a digital unit and an analog unit, and the analog unit may include a plurality of sub-units according to an operating power and an operating frequency. The digital unit may be implemented with at least one processor (e.g., a digital signal processor (DSP)).

The wireless communication unit 210 transmits and receives the signals as stated above. Hence, whole or part of the wireless communication unit 210 may be referred to as 'a transmitter', 'a receiver', or 'a transceiver'. Also, in the following, the transmission and the reception over the radio channel is used as the meaning which embraces the above-stated processing of the wireless communication unit 210.

The backhaul communication unit 220 provides an interface for communicating with other nodes in the network. That is, the backhaul communication unit 220 converts a bit sting transmitted from the base station to another node, for example, to another access node, another base station, an upper node, or a core network, to a physical signal, and converts a physical signal received from the other node to a bit string.

The storage unit 230 stores a basic program for operating the base station, an application program, and data such as setting information. The storage unit 230 may include a volatile memory, a non-volatile memory, or a combination of a volatile memory and a non-volatile memory. The storage unit 230 provides the stored data at a request of the control unit 240.

The control unit 240 controls general operations of the base station. For example, the control unit 240 transmits and receives signals through the wireless communication unit 210 or the backhaul communication unit 220. Also, the control unit 240 records and reads data in and from the storage unit 230. The control unit 240 may execute functions of a protocol stack requested by a communication standard. According to another embodiment, the protocol stack may be included in the wireless communication unit 210. For doing so, the control unit 240 may include at least one processor. According to various embodiments, the control unit 240 may control the base station to carry out operations according to various embodiments to be described.

Figure 3:
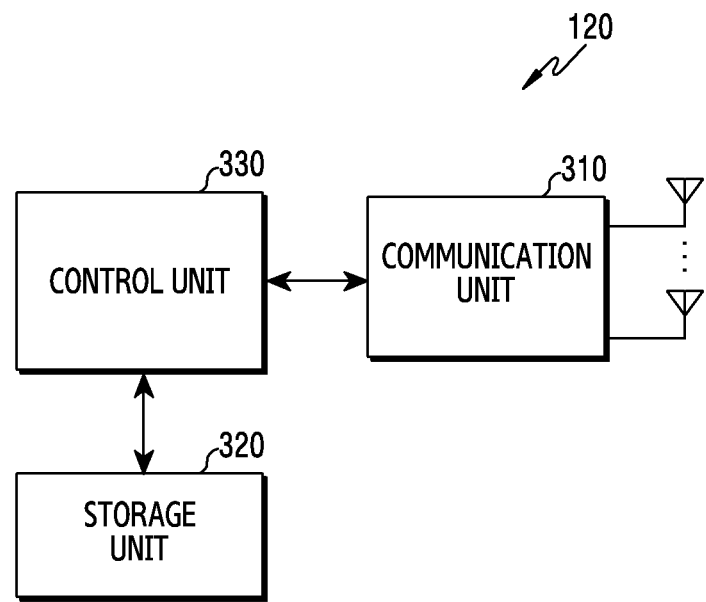
FIG. 3 illustrates a configuration of a terminal in a wireless communication system according to various embodiments of the present disclosure.

FIG. 3 illustrates a configuration of a terminal in a wireless communication system according to various embodiments of the present disclosure. The configuration illustrated in FIG. 3 may be understood as the configuration of the terminal 120. A term such as 'portion' or 'er' used hereafter indicates a unit for processing at least one function or operation, and may be implemented using hardware, software, or a combination of hardware and software.

Referring to FIG. 3, the terminal 120 includes a communication unit 310, a storage unit 320, and a control unit 330.

The communication unit 310 may perform functions for transmitting and receiving signals over a radio channel. For example, the communication unit 310 performs a conversion function between a baseband signal and a bit string according to a physical layer standard of the system. For example, in data transmission, the communication unit 310 generates complex symbols by encoding and modulating a transmit bit string. Also, in data reception, the communication unit 310 restores a receive bit string by demodulating and decoding a baseband signal. Also, the communication unit 310 up-converts the baseband signal to an RF band signal, transmits it via an antenna, and down-converts an RF band signal received via the antenna to a baseband signal. For example, the communication unit 310 may include a transmit filter, a receive filter, an amplifier, a mixer, an oscillator, a DAC, an ADC, and the like.

Also, the communication unit 310 may include a plurality of transmit and receive paths. Further, the communication unit 310 may include at least one antenna array including a plurality of antenna elements. In view of the hardware, the wireless communication unit 310 may include a digital circuit and an analog circuit (e.g., an RF integrated circuit (RFIC)). Herein, the digital circuit and the analog circuit may be implemented as a single package. Also, the communication unit 310 may include a plurality of RF chains. Further, the communication unit 310 may perform the beamforming.

The communication unit 310 transmits and receives the signals as stated above. Hence, whole or part of the communication unit 310 may be referred to as 'a transmitter', 'a receiver', or 'a transceiver'. In addition, the transmission and the reception over the radio channel are used as the meaning which embraces the above-stated processing of the communication unit 310 in the following explanations.

The storage unit 320 stores a basic program for operating the terminal, an application program, and data such as setting information. The storage unit 320 may include a volatile memory, a non-volatile memory, or a combination of a volatile memory and a non-volatile memory. The storage unit 320 provides the stored data according to a request of the control unit 330.

The control unit 330 controls general operations of the terminal. For example, the control unit 330 transmits and receives signals through the communication unit 310. Also, the control unit 330 records and reads data in and from the storage unit 320. The control unit 330 may execute functions of a protocol stack required by a communication standard. For doing so, the control unit 330 may include at least one processor or microprocessor, or may be part of a processor. In addition, part of the communication unit 310 and the control unit 330 may be referred to as a communication processor (CP). According to various embodiments, the control unit 330 may control the terminal to carry out operations according to various embodiments to be described.

Figure 4:
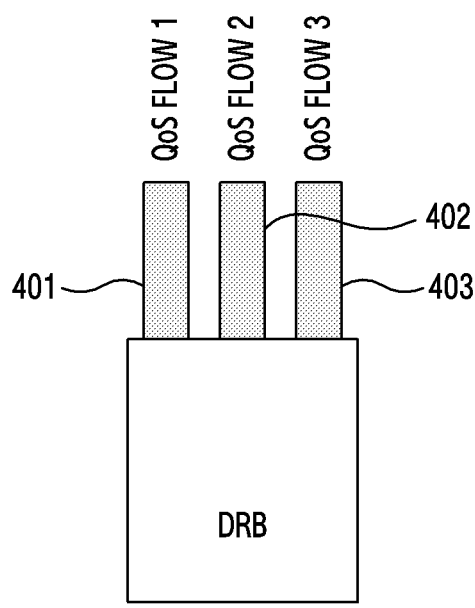
FIG. 4 illustrates an example in which a plurality of quality of service (QoS) flows is mixed with a data radio bearer in a wireless communication system according to various embodiments of the present disclosure.

FIG. 4 illustrates an example in which a plurality of quality of service (QoS) flows is mixed with a data radio bearer (DRB) in a wireless communication system according to various embodiments of the present disclosure. Referring to FIG. 4, a QoS flow 1 401, a QoS flow 2 402, and a QoS flow 3 403 belong to one DRB. Traffic of the communication network may be classified into the QoS flows according to a required QoS. In this case, one or more QoS flows may be mixed in one radio bearer and transmitted. Which QoS flow will be transmitted in which DRB may be determined by an entity of the communication system such as a base station. The QoS flows transmitted mostly over one DRB generally have similar QoS characteristics, but not necessarily.

A terminal and a base station may perform data communication of various types. In data such as voice among various types of data, a constant transmission speed, that, bit rate, needs be ensured not to cause deterioration of quality. A voice codec generally supports various codec rates, and a higher codec rate enables a higher quality service. Thus, in view of a user, it is important to stably ensure the highest codec rate. To ensure the high code rate, a sufficient bit rate must be guaranteed in a radio section between the base station and the terminal. For doing so, as shown in the embodiment of FIG. 5, the terminal may request the base station to recommend the bit rate, and the base station may recommend the bit rate for specific traffic to the terminal.

Figure 5:
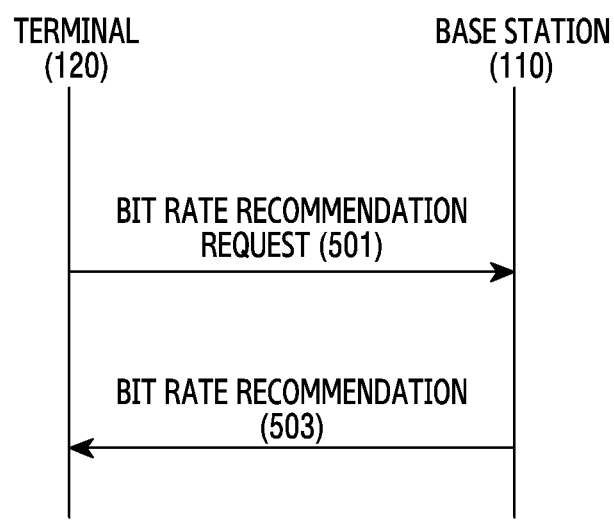
FIG. 5 illustrates signal exchanges for bit rate recommendation in a wireless communication system according to various embodiments of the present disclosure.

FIG. 5 illustrates signal exchange for bit rate recommendation in a wireless communication system according to various embodiments of the present disclosure. Referring to FIG. 5, a terminal 120 transmits a bit rate recommendation request to a base station 110 in step 501. In step 503, the base station 110 transmits a bit rate recommendation to the terminal 120. As such, the terminal 120 receiving the recommended bit rate from the base station 110 for specific traffic may determine an appropriate codec rate using the recommended value, and perform a voice service. The bit rate recommendation procedure in FIG. 5 is not limited to the voice service, and may be applied to other service such as video. An example of the information transmitted in the bit rate recommendation request and bit rate recommendation operation is shown in the following FIG. 6.

Figure 6:
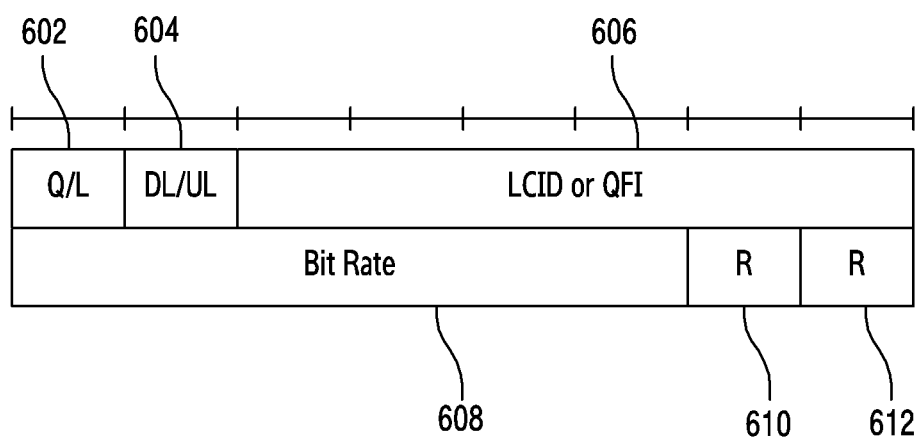
FIG. 6 illustrates a data format used for bit rate recommendation request and bit rate recommendation in a wireless communication system according to various embodiments of the present disclosure.

FIG. 6 illustrates a data format used for bit rate recommendation request and bit rate recommendation in a wireless communication system according to various embodiments of the present disclosure. FIG. 6 illustrates the data format used for the bit rate recommendation request and the bit rate recommendation described in FIG. 5. Bit rate recommendation and bit rate recommendation messages may be transmitted as a control element (CE) of a medium access control (MAC) layer or as a radio resource control (RRC) message. FIG. 6 illustrates the format transmitted as the MAC CE, but the same or similar elements may be included in the RRC message. The message format shown in FIG. 6 may be applied to both of the bit rate recommendation request message and the bit rate recommendation message. The corresponding bit rate recommendation request and bit rate recommendation indicates an operation of recommending a bit rate per specific traffic. The specific traffic may correspond to one logical channel or one QoS flow.

For example, a specific voice service may exclusively use one logical channel. In this case, a unit for classifying the voice service may be a logical channel, and an identifier of the logical channel, that is, a logical channel identifier (hereinafter, 'LCD') may be used as the unit for classifying the voice service. In this case, the LCID used may be an LCID value used by a MAC entity transmitting a corresponding message, or an LCID value used in a master cell group. As another example, the specific voice service may be provided through one QoS flow, and an identifier of a QoS flow, that is, a QoS flow ID (QFI) may be used as the unit for distinguishing the voice service.

Information included in the bit rate recommendation request and bit rate recommendation message may vary according to the unit for classifying the specific traffic. FIG. 6 shows the example of the format of the corresponding message. Referring to FIG. 6, a Q/L field 602 is an identifier for identifying whether the unit of the traffic for the bit rate recommendation request and the bit rate recommendation is the QoS flow or the LCD. A DL/UL field 604 is an identifier for identifying whether the traffic for the bit rate recommendation request and the bit rate recommendation is downlink (DL) or uplink (UL). An LCID or QFI field 606 is a field indicating an actual LCID or QFI value for performing the bit rate recommendation request and the bit rate recommendation by the value indicated in the Q/L field. If the value of the Q/L field 602 indicates the QoS flow ID, the QFI value may be displayed, and if the Q/L field value indicates the LCD, the LCID value may be displayed in the LCID or QFI field 606. A bit rate field 608 may indicate a bit rate value desired by the terminal in the bit rate recommendation request message, and a bit rate value recommended by the base station in the bit rate recommendation message. R fields 610 and 612 are fields which are used for matching a byte length or reserved.

Figure 7:
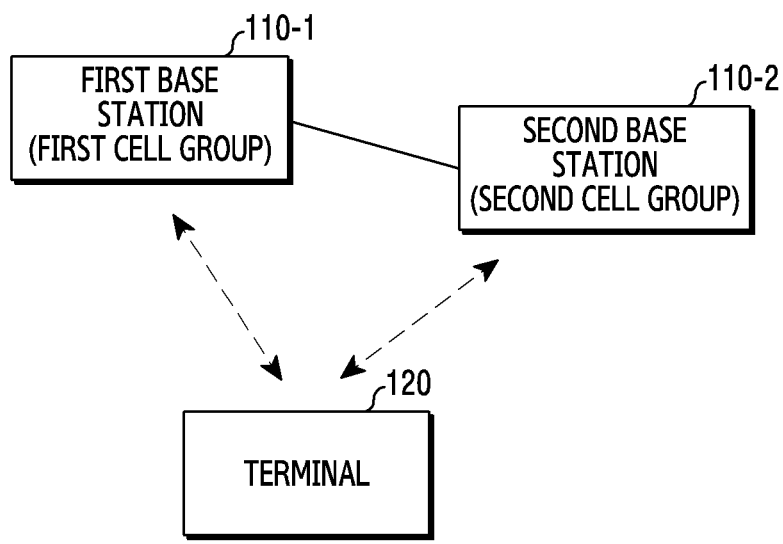
FIG. 7 illustrates a dual connectivity (DC) structure in a wireless communication system according to various embodiments of the present disclosure.

FIG. 7 illustrates a dual connectivity (DC) structure in a wireless communication system according to various embodiments of the present disclosure.

In the dual connectivity structure, it is assumed that a terminal is connected to two or more base stations. Referring to FIG. 7, the terminal 120 is connected to a first base station 110-1 and a second base station 110-2. In the connection to each base station, a plurality of cells may be configured, and these cells may be collectively referred to as a 'cell group'. In this case, the cell group configured in connection with the first base station 110-1 may be referred to as a first cell group, and the cell group configured in connection with the second base station 110-2 may be referred to as a second cell group. The terminal 120 may transmit/receive data to/from the first base station 110-1, transmit/receive data to/from the second base station 110-2, or transmit/receive data to/from both of the first base station 110-1 and the second base station 110-2 according to a type of a configured radio bearer. Alternatively, the terminal 120 may copy and then transmit the same data to each of the first base station 110-1 and the second base station 110-2, that is, perform a packet duplication operation.

If the terminal 120 performs communication in the dual connectivity structure, a difference of the bit rate may occur to a wireless channel environment, a bandwidth, a base station policy and other various reasons, between a link between the first base station 110-1 and the terminal 120 and a link between the second base station 110-2 and the terminal 120. In this case, the process of receiving a bit rate recommendation from a single base station may not be sufficient.

Figure 8:
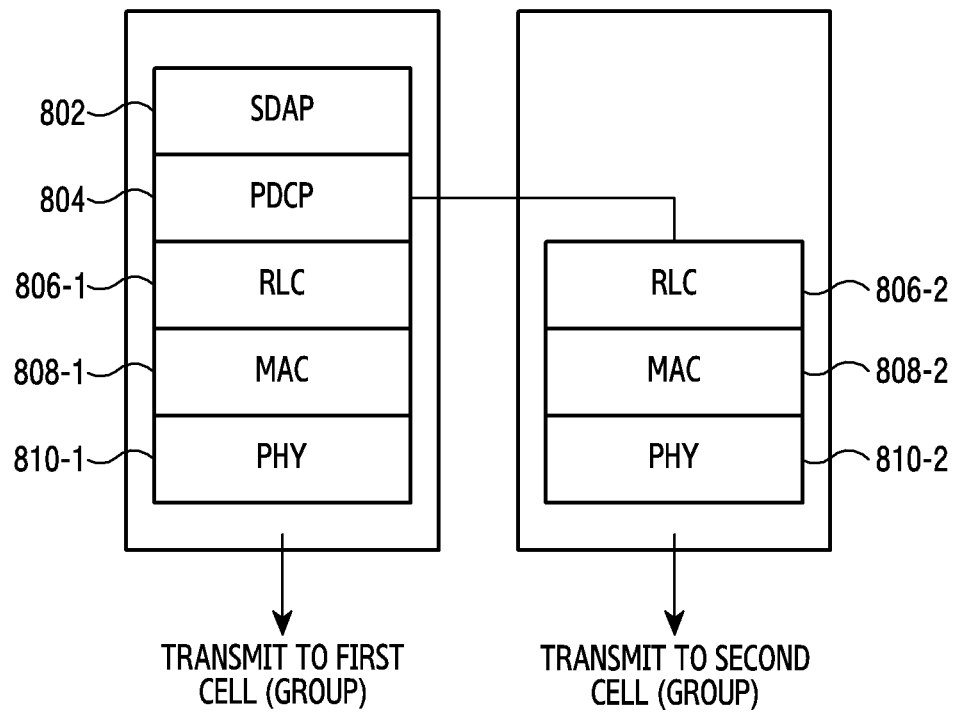
FIG. 8 illustrates a split bearer protocol structure of a dual connectivity structure in a wireless communication system according to various embodiments of the present disclosure.

FIG. 8 illustrates a split bearer protocol structure of a dual connectivity structure in a wireless communication system according to various embodiments of the present disclosure.

Referring to FIG. 8, in a split bearer, a service data adaptation protocol (SDAP) 802 and a packet data convergence protocol (PDCP) 804 may exist as a single protocol, and radio link control (RLC) 806-1 and 806-2, MAC 808-1 and 808-2, and PHY 810-1 and 810-2 may exist each for every cell group. If a terminal performs communication in the dual connectivity structure, a difference of the bit rate may occur due to a wireless channel environment, a bandwidth, a base station policy and other various reasons, between a link between a first base station and the terminal and a link between a second base station and the terminal. In this case, the process of receiving a bit rate recommendation from a single base station may not be sufficient.

According to various embodiments, the terminal may transmit a bit rate recommendation request message to one of the base stations of the dual connectivity structure. For example, which base station the bit rate recommendation request message is transmitted to may be preset by the base station, or may be prearranged to a master base station (e.g., a master gNB or a master eNB) or a secondary base station (e.g., a secondary gNB or a secondary eNB) of the dual connectivity structure. As another example, which base station the bit rate recommendation request message is transmitted to may be directly selected by the terminal based on the radio link status, bearer setup, resource allocation or other reasons. In this case, the used message may conform to the format of FIG. 6.

According to an embodiment, the base station may determine a bit rate value to recommend to the terminal, after receiving the bit rate recommendation request message or at determining that the bit rate recommendation is necessary. In this case, in the split bearer environment, the bit rate value may be determined by considering that the terminal communicates with both of the first base station and the second base station. In this case, the bit rate value may be a minimum value, a maximum value, an average value, a median value, or other representative value of a first bit rate recommendable by the first base station and a second bit rate recommendable by the second base station. Herein, the representative value is determined according to a function having at least one of the first bit rate and the second bit rate as an input variable, and the function may be defined variously. The first base station may use a link measurement value between the second base station and the terminal to determine the bit rate.

If the bit rate value to recommend to the terminal is determined, the bit rate may be recommended to the terminal. In this case, the used message may conform to the format of FIG. 6. The first base station may also notify the second base station of the bit rate value recommended to the terminal. Based on this, the second base station may provide the bit rate recommended to the terminal in the split bearer operation. After receiving the bit rate recommendation message, the terminal may communicate by determining the bit rate or the codec rate of the corresponding traffic using this value.

Figure 9:
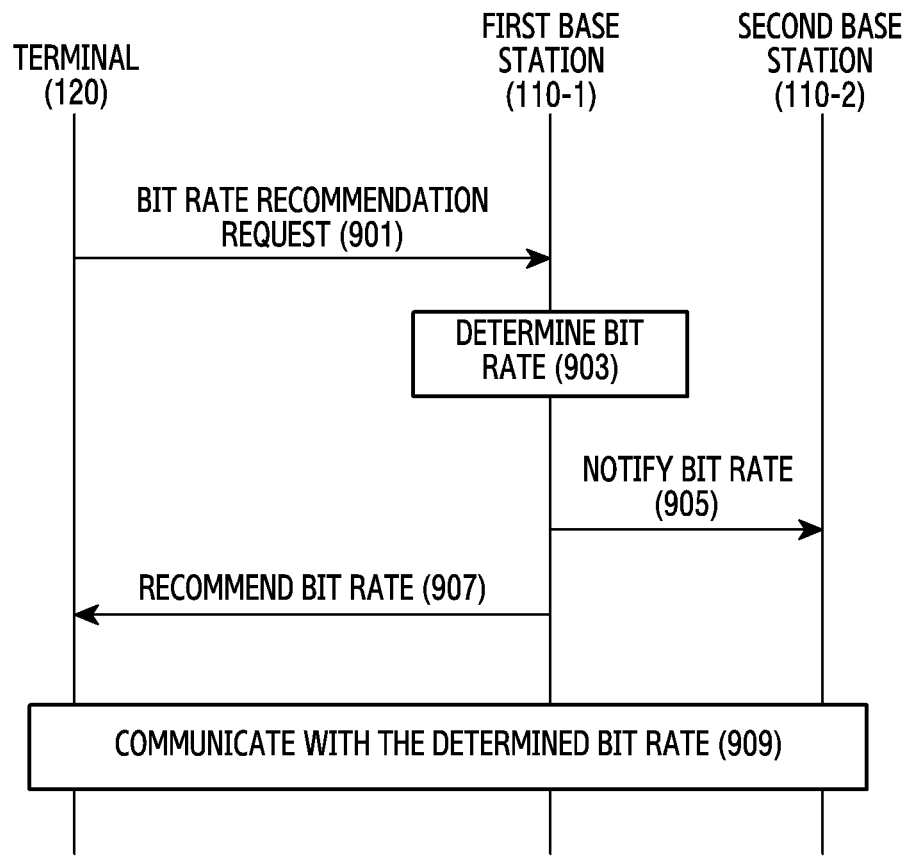
FIG. 9 illustrates signal exchange for a bit rate recommendation request and bit rate recommendation process at a split bearer in a wireless communication system according to various embodiments of the present disclosure.

The procedure according to the above-described embodiment is explained below with reference to FIG. 9. FIG. 9 illustrates signal exchange for a bit rate recommendation request and bit rate recommendation process at a split bearer in a wireless communication system according to various embodiments of the present disclosure. Referring to FIG. 9, in step 901, the terminal 120 transmits a bit rate recommendation request to the first base station 110-1. In step 903, the first base station 110-1 determines a bit rate for the terminal 120. Next, in step 905, the first base station 110-1 notifies the determined bit rate to the second base station 110-2. In step 907, the first base station 110-1 transmits a bit rate recommendation to the terminal 120. Next, in step 909, the terminal 120 communicates with the first base station 110-1 and the second base station 110-2 according to the determined bit rate.

According to the embodiment described with reference to FIG. 9, the first base station 110-1 notifies the determined bit rate to the second base station 110-2 in step 905. Herein, a message transmitted to notify the bit rate may include at least one of the determined bit rate, information (e.g., identification information of the terminal 120) indicating which terminal the determined bit rate is for, information indicating whether a link to which the corresponding bit rate is applied is downlink or uplink, information (e.g., data radio bearer identifier (DRBID)) notifying a bearer to which the corresponding bit rate is applied, information (e.g., LCID) indicating a logical channel for data to which the corresponding bit rate is applied, information (e.g., a QoS flow ID) indicating a QoS flow to which the corresponding bit rate is applied, a traffic type (e.g., voice, video, etc.) for supporting the bit rate, and a latency requirement of the traffic.

According to the embodiment described with reference to FIG. 9, the first base station 110-1 notifies the determined bit rate to the second base station 110-2 in step 905, and the first base station 110-1 transmits the bit rate recommendation to the terminal 120 in step 907. According to an embodiment, the bit rate notified in step 905 may be different from the bit rate recommended by the first base station 110-1 to the terminal 120. According to an embodiment, the bit rate transmitted in step 905 may be a bit rate to be supported by the second base station 110-2, which may be different from the bit rate guaranteed in the communication of the terminal 120 with the first base station 110-1 or the second base station 110-2 in step 907. For example, the bit rate recommended in step 907 may be higher than or equal to the bit rate notified in step 905.

According to the embodiment explained with reference to FIG. 9, in step 909, the terminal 120 communicates with the first base station 110-1 and the second base station 110-2 according to the determined bit rate. In this case, the second base station 110-1 may perform resource allocation to support the bit rate notified by the message received from the first base station 110-1 in step 905. For example, the second base station 110-2 may periodically allocate resources for satisfying the bit rate received from the first base station 110-1. For example, the resource allocation may be conducted through periodic resource allocation such as downlink semi-persistent scheduling (SPS) or uplink configured grant.

According to the embodiment described with reference to FIG. 9, in step 909, the terminal 120 communicates with the first base station 110-1 and the second base station 110-2 according to the determined bit rate. In this case, the terminal 120 may set the codec rate of the application layer to a value corresponding to the bit rate recommended by the message received in step 907. According to an embodiment, if a split bearer is configured for the first base station 110-1 and the second base station 110-2, a threshold-based split bearer operation may be conducted. According to the threshold-based split bearer operation, to transmit data of a size exceeding a threshold, the terminal may divide and transmit data through primary RLC and secondary RLC.

According to various embodiments, the terminal may transmit a bit rate recommendation request message to one of the base stations of the dual connectivity structure. For example, which base station the bit rate recommendation request message is transmitted to may be preset by the base station, or may be prearranged to a master base station (e.g., a master gNB or a master eNB) or a secondary base station (e.g., a secondary gNB or a secondary eNB) of the dual connectivity structure. As another example, which base station the bit rate recommendation request message is transmitted to may be directly selected by the terminal based on the radio link status, bearer setup, resource allocation or other reasons. In this case, the used message may conform to the format of FIG. 6.

According to an embodiment, the base station may determine a bit rate value to recommend to the terminal, after receiving the bit rate recommendation request message or at determining that the bit rate recommendation is necessary. In this case, in the split bearer environment, the bit rate value may be determined by considering that the terminal communicates with both of the first base station and the second base station. For doing so, the first base station may request a bit rate to recommended for the corresponding traffic from the second base station. In this case, the used message may conform to the format illustrated in FIG. 6. The second base station may transmit the bit rate value to recommend to the terminal to the first base station. Based on this, the first base station determines the bit rate to be provided to the terminal. In this case, the bit rate value may be a minimum value, a maximum value, an average value, a median value, or other representative value of the bit rate recommendable by the first base station and the bit rate recommendable by the second base station. Herein, the representative value is determined according to a function having at least one of the first bit rate and the second bit rate as an input variable, and the function may be defined variously. In addition, the first base station may use the link measurement value between the second base station and the terminal to determine the bit rate.

If determining the bit rate value to recommend to the terminal, the first base station may recommend the bit rate to the terminal. In this case, the used message may conform to the format of FIG. 6. The first base station may notify the second base station of the bit rate value finally recommended to the terminal. Based on this, the second base station may provide the bit rate recommended to the terminal in the split bearer operation. After receiving the bit rate recommendation message, the terminal may communicate by determining the bit rate or the codec rate of the corresponding traffic using this value.

Meanwhile, according to yet another embodiment, the first base station may forward the bit rate received from the second base station to the terminal. In this case, both of the first bit rate recommended by the first base station and the second bit rate recommended by the second base station may be transmitted to the terminal.

Figure 10:
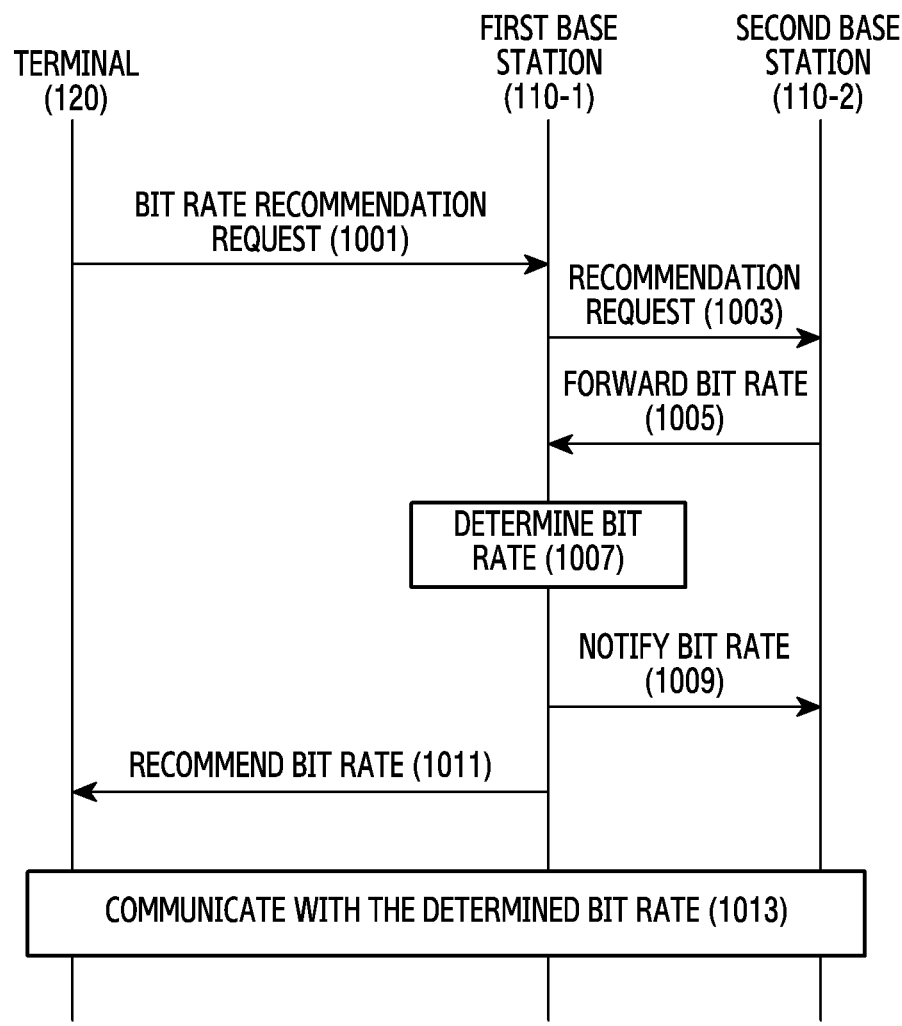
FIG. 10 illustrates another signal exchange for a bit rate recommendation request and bit rate recommendation process at a split bearer in a wireless communication system according to various embodiments of the present disclosure.

The procedure according to the aforementioned embodiment is explained below with reference to FIG. 10. FIG. 10 illustrates another signal exchange for a bit rate recommendation request and bit rate recommendation process at a split bearer in a wireless communication system according to various embodiments of the present disclosure. Referring to FIG. 10, in step 1001, the terminal 120 transmits a bit rate recommendation request to the first base station 110-1. In step 1003, the first base station 110-1 transmits a bit rate request to the second base station 110-2. Next, in step 1005, the second base station 110-2 forwards the bit rate to the first base station 110-1. Next, in step 1007, the first base station 110-1 determines a bit rate for the terminal 120. Next, in step 1009, the first base station 110-1 notifies the second base station 110-2 of the determined bit rate. In step 1011, the first base station 110-1 transmits a bit rate recommendation to the terminal 120. Next, in step 1013, the terminal 120 communicates with the first base station 110-1 and the second base station 110-2 according to the determined bit rate.

According to the embodiment described with reference to FIG. 10, the first base station 110-1 transmits the bit rate request to the second base station 110-2 in step 1003, the second base station 110-2 transmits the bit rate to the first base station 110-1 in step 1005, and the first base station 110-1 notifies the determined bit rate to the second base station 110-2 in step 1009. At this time, the message transmitted in step 1003, step 1005 or step 1009 may include at least one of the bit rate, information (e.g., identification information of the terminal 120) indicating which terminal the corresponding bit rate is for, information indicating whether a link to which the corresponding bit rate is applied is downlink or uplink, information (e.g., DRBID) notifying a bearer to which the bit rate is applied, information (e.g., LCD) indicating a logical channel for data to which the corresponding bit rate is applied, information (e.g., a QoS flow ID) indicating a QoS flow to which the corresponding bit rate is applied, a traffic type (e.g., voice, video, etc.) for supporting the corresponding bit rate, and a latency requirement of the traffic.

According to the embodiment described with reference to FIG. 10, the first base station 110-1 notifies the determined bit rate to the second base station 110-2 in step 1009, and the first base station 110-1 transmits the bit rate recommendation to the terminal 120 in step 1011. According to an embodiment, the bit rate notified in step 1009 may be different from the bit rate recommended by the first base station 110-1 to the terminal 120. According to an embodiment, the bit rate transmitted in step 1009 may be a bit rate to be supported by the second base station 110-2, which may be different from the bit rate guaranteed in the communication of the terminal 120 with the first base station 110-1 or the second base station 110-2 in step 1011. For example, the bit rate recommended in step 1011 may be higher than or equal to the bit rate notified in step 1005.

According to the embodiment described with reference to FIG. 10, in step 1013, the terminal 120 communicates with the first base station 110-1 and the second base station 110-2 according to the determined bit rate. In this case, the second base station 110-1 may perform resource allocation to support the bit rate notified by the message received from the first base station 110-1 in step 1009. For example, the second base station 110-2 may periodically allocate resources for satisfying the bit rate received from the first base station 110-1. For example, the resource allocation may be conducted through periodic resource allocation such as downlink SPS or uplink configured grant.

According to the embodiment described with reference to FIG. 10, in step 1013, the terminal 120 communicates with the first base station 110-1 and the second base station 110-2 according to the determined bit rate. In so doing, the terminal 120 may set the codec rate of the application layer to a value corresponding to the bit rate recommended by the message received in step 1011. According to an embodiment, if a split bearer is configured for the first base station 110-1 and the second base station 110-2, the threshold-based split bearer operation may be performed. According to the threshold-based split bearer operation, to transmit data of a size exceeding a threshold, the terminal may divide and transmit data through primary RLC and secondary RLC.

According to another embodiment, after performing the bit rate recommendation request and the bit rate recommendation operation with the first base station and the second base station without mutual information exchange of the first base station and the second base station, the terminal may determine the bit rate. A procedure according to this embodiment is described below with reference to FIG. 11.

Figure 11:
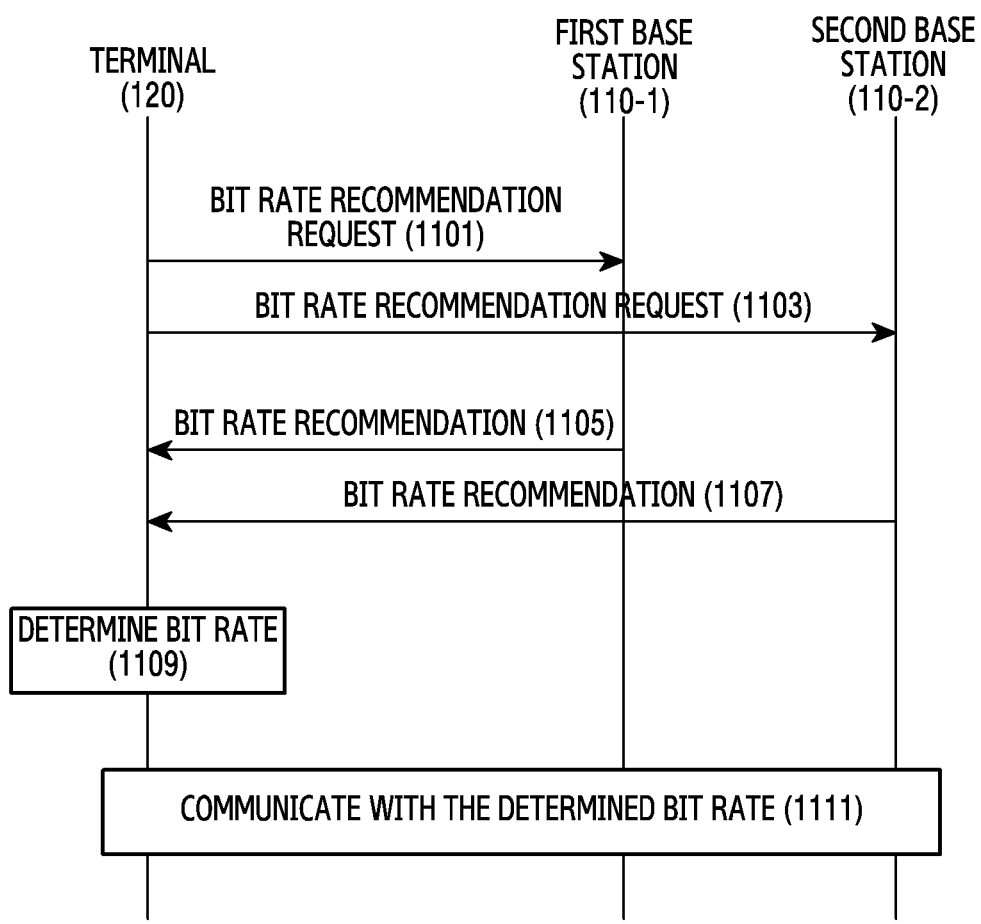
FIG. 11 illustrates yet another signal exchange for a bit rate recommendation request and bit rate recommendation process at a split bearer in a wireless communication system according to various embodiments of the present disclosure.

FIG. 11 illustrates yet another signal exchange for a bit rate recommendation request and bit rate recommendation process at a split bearer in a wireless communication system according to various embodiments of the present disclosure. Referring to FIG. 11, in step 1101, the terminal 120 transmits a bit rate recommendation request to the first base station 110-1. Also, in step 1103, the terminal 120 transmits a bit rate recommendation request to the second base station 110-2. In step 1105, the first base station 110-1 transmits a bit rate recommendation to the terminal 120. Also, in step 1107, the second base station 110-2 transmits a bit rate recommendation to the terminal 120. Next, in step 1109, the terminal 120 determines one bit rate based on the bit rate recommendations received from the first base station 110-1 and the second base station 110-2. Next, in step 1111, the terminal 120 communicates with the first base station 110-1 and the second base station 110-2 according to the determined bit rate.

According to the embodiment of FIG. 11, if requiring the bit rate recommendation, the terminal may transmit the bit rate recommendation request message to each base station configured as the split bearer. In this case, the used message may conform to the format of FIG. 6. The first base station and the second base station may recommend a bit rate corresponding to a corresponding logical channel or QoS flow. In this case, the used message may also conform to the format of FIG. 6. The terminal may receive bit rate recommendation messages from the first base station and the second base station respectively, and then determine the actual bit rate or codec rate by using these values. For example, the bit rate value may be a minimum value, a maximum value, an average value, a median value, or other representative value of the first bit rate recommended by the first base station and the second bit rate recommended by the second base station. As another example, a bit rate value recommended by a base station which is as a default path among the first base station and the second base station may be used as the representative value. In this case, the default path may be a path used if the size of data queueing in the split bearer is smaller than a specific threshold. According to another embodiment, the default path may be a path used by the terminal in uplink data transmission. In addition, the base station may configure in advance which representative value is used.

Figure 12:
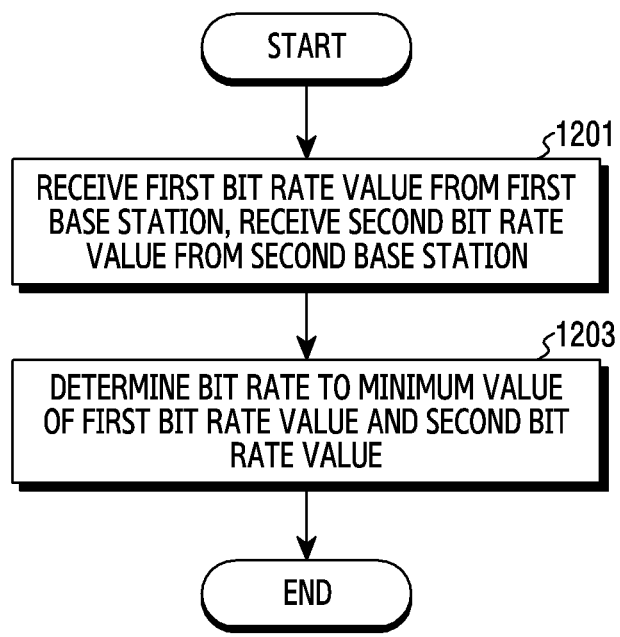
FIG. 12 illustrates a flowchart for setting a bit rate at a split bearer in a wireless communication system according to various embodiments of the present disclosure.

FIG. 12 illustrates a flowchart for setting a bit rate at a split bearer in a wireless communication system according to various embodiments of the present disclosure. FIG. 12 illustrates an operating method of the terminal 120.

Referring to FIG. 12, in step 1201, the terminal receives bit rate recommendation messages from the first base station and the second base station respectively. Next, in step 1203, the terminal may determine a bit rate or a codec rate to be actually used by utilizing the received values. For example, the bit rate may be set to a minimum value of the first bit rate received from the first base station and the second bit rate received from the second base station.

Figure 13:
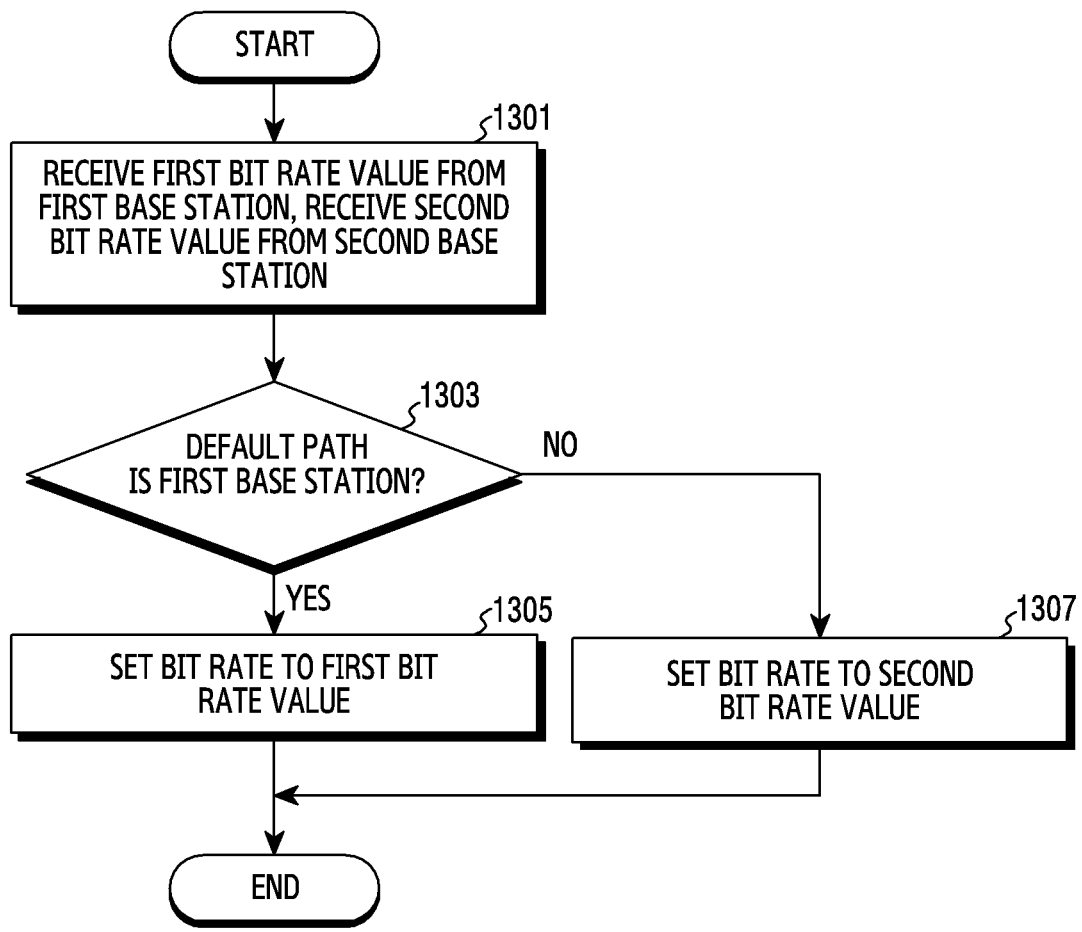
FIG. 13 illustrates another flowchart for setting a bit rate at a split bearer in a wireless communication system according to various embodiments of the present disclosure.

FIG. 13 illustrates another flowchart for setting a bit rate at a split bearer in a wireless communication system according to various embodiments of the present disclosure. FIG. 13 illustrates an operating method of the terminal 120.

Referring to FIG. 13, in step 1301, the terminal receives bit rate recommendation messages from the first base station and the second base station respectively. Next, in step 1303, the terminal determines whether the default path is the first base station. If the default path is the first base station, the terminal sets the bit rate to the first bit rate value received from the first base station, in step 1305. If the default path is not the first base station, that is, if the default path is the second base station, the terminal sets the bit rate to the second bit rate value received from the second base station, in step 1307.

As shown in the embodiment of FIG. 13, the terminal may determine the bit rate or the codec rate to actually use by utilizing the values received from the first base station and the second base station respectively. For example, the actual bit rate may be set to the bit rate of the base station of the default path among the first bit rate received from the first base station and the second bit rate received from the second base station.

Figure 14:
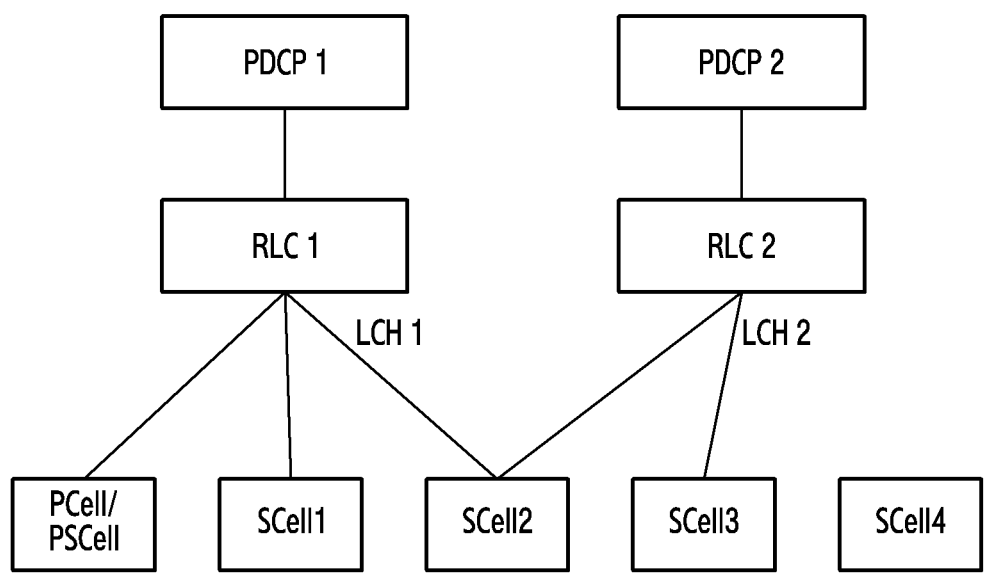
FIG. 14 illustrates an example of mapping logical channels to cells in a wireless communication system according to various embodiments of the present disclosure.

FIG. 14 illustrates an example of mapping logical channels to cells in a wireless communication system according to various embodiments of the present disclosure. Cells in the communication system may be divided into several cells such as a primary cell (PCell), a primary secondary cell (PSCell), or a secondary cell (SCell). Each cell may be used for a specific purpose in a network, and may have cell characteristics such as a different frequency, a sub-carrier spacing (SCS), and a physical uplink shared channel (PUSCH) duration. In addition, the serviced traffic may be divided into a logical channel and a QoS flow according to their characteristics and have different priorities. Considering this, a network device such as a base station may separately configure a cell usable by a specific logical channel. For example, a logical channel for processing a voice service may transmit data using only a specific cell.

Referring to FIG. 14, there are two logical channels such as logical channel (LCH) 1 and LCH 2, and the LCH 1 and the LCH 2 correspond to RLC 1 and RLC 2 respectively. The LCH1 may use a PCell or a PSCell, a SCell1, and a SCell2, and the LCH2 may use a SCell2 and a SCell3. In the embodiment of FIG. 14, it is assumed that the SCell3 is configured to the terminal but does not use any logical channel. If the LCH1 or the LCH2 is a logical channel for the packet duplication, if the packet duplication is disabled, data transmission may be conducted to all the configured cells.

Figure 15:
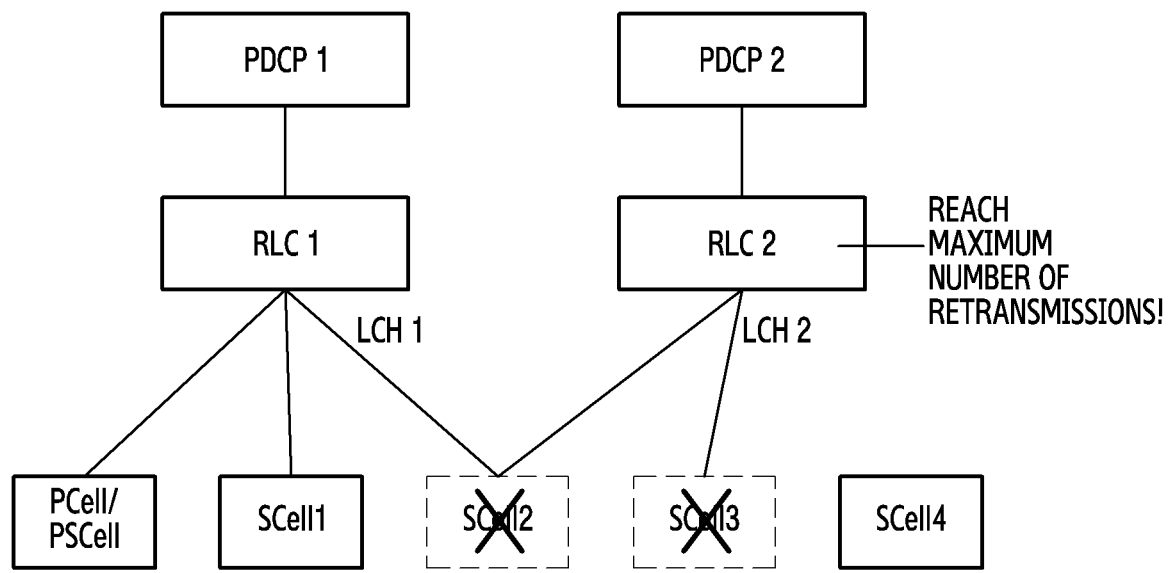
FIG. 15 illustrates an example in which a terminal operates if retransmission reaches the maximum number of retransmissions in a specific radio link control (RLC) device in a wireless communication system according to various embodiments of the present disclosure.

FIG. 15 illustrates an example in which a terminal operates if retransmission reaches the maximum number of retransmissions at a specific RLC device in a wireless communication system according to various embodiments of the present disclosure. If an available cell reaches the maximum number of retransmissions of the RLC device corresponding to the limited logical channel, the terminal may determine this situation as a situation in which a problem occurs in the corresponding cell (e.g., a bad radio link or error occurrence), and suspend transmission to the corresponding cell. In the embodiment of FIG. 15, if the retransmission of the RLC2 reaches the maximum number of retransmissions, and the LCH2 is configured to transmit data to the SCell2 and the SCell3, the terminal may not transmit data even though uplink resources of the SCell2 and the SCell3 are allocated later.

According to an embodiment, the radio bearer may be configured in both directions of the downlink and the uplink. In this case, it may be necessary to transmit a status report message of downlink packet transmission. However, if the retransmission of the RLC2 reaches the maximum number of retransmissions and the LCH2 does not perform the data transmission to the SCell2 and the SCell3, it is impossible to transmit the status report message. However, since information transfer of the downlink transmission is necessary, the status report of the downlink transmission of the RLC device which reaches the maximum number of the retransmissions may be transmitted through other activated cell.

The packet duplication transmission for the radio bearer configured in the RLC2 may be configured. In this case, if the data transmission through the cells associated with the RLC2 is limited because the retransmission of the RLC2 reaches the maximum number of retransmissions, it is difficult to normally conduct the packet duplication transmission operation. Hence, according to an embodiment, if the packet duplication transmission is set, even though the retransmission reaches the maximum number of retransmissions, RLC devices configured in the radio bearer may transmit data through other cell, without restriction of cells configured in the same cell group. For example, if the packet duplication transmission is configured in the radio bearer configured in the RLC2, and the retransmission of the RLC2 reaches the maximum number of retransmissions, the terminal may transmit the duplicated packet through other cell (e.g., SCell1) than the SCell2 and the SCell3 associated with the RLC2.

Figure 16:
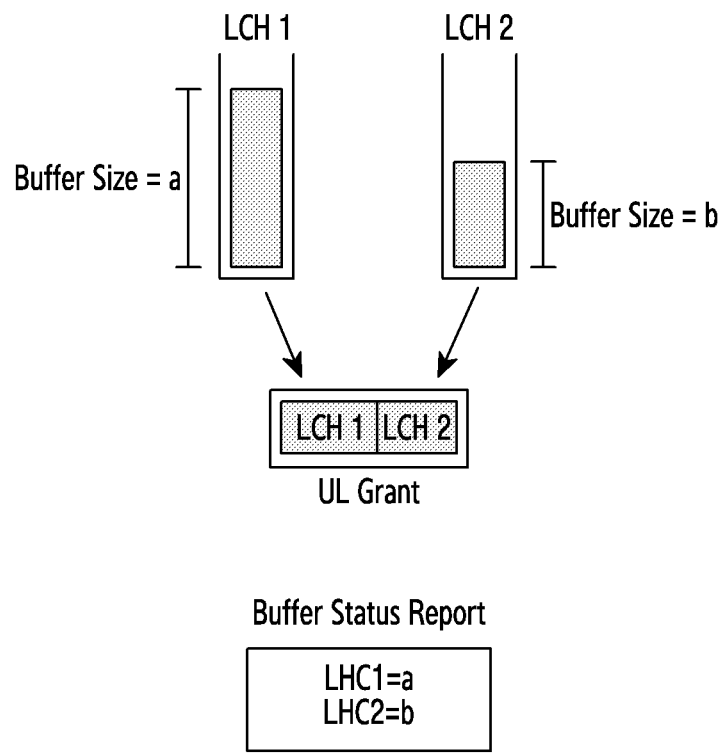
FIG. 16 illustrates uplink transmission and buffer status report operations in a wireless communication system according to various embodiments of the present disclosure.

FIG. 16 illustrates uplink transmission and buffer status report operations in a wireless communication system according to various embodiments of the present disclosure. The embodiment of FIG. 16 assumes that there are the LCH1 and the LCH2, and each buffer size is a and b at a specific time point. If receiving an uplink grant, the terminal may determine a data size to transmit in the LCH1 and the LCH2 through a logical channel prioritization operation, then divide the data, and perform packet transmission over the LCH1 and the LCH2. In so doing, only logical channels capable of transmitting data to a cell to which allocated uplink radio resources belong participate in the logical channel prioritization.

If the buffer status report message is triggered, the terminal calculates a data volume to transmit over all the logical channels, that is, the buffer size, and then transmits a buffer status report message to the base station. The buffer status report message indicates a data volume remaining for each logical channel group (LCG), and each logical channel may belong to one or more logical channel groups. Although FIG. 16 illustrates that the buffer size is reported per logical channel, the buffer size may be transmitted per logical channel group according to another embodiment. If other data is included in a MAC protocol data unit (MAC PDU) transmitting the buffer status report message, the buffer status report message may indicate the remaining data volume excluding the data volume included in the MAC PDU.

Figure 17:
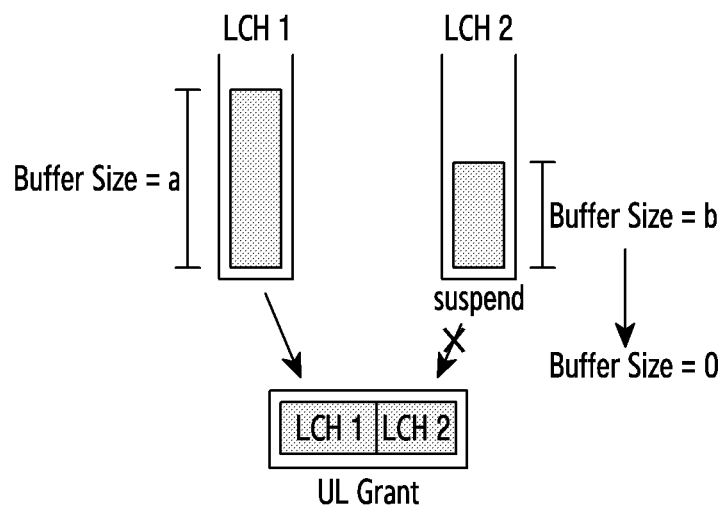
FIG. 17 illustrates an embodiment in which a terminal operates if retransmission reaches the maximum number of retransmissions in a specific radio link control (RLC) device in a wireless communication system according to various embodiments of the present disclosure.

FIG. 17 depicts an embodiment in which a terminal operates if retransmission reaches the maximum number of retransmissions at a specific RLC device in a wireless communication system according to various embodiments of the present disclosure. The embodiment of FIG. 17 assumes that the RLC device corresponding to the LCH2 reaches the maximum number of retransmissions as in the embodiment of FIG. 15. In the example of FIG. 17, the buffer size is the same as in the example of FIG. 15.

If reaching the maximum number of retransmissions, the corresponding RLC device does not have to transmit data any more. Thus, even if the corresponding RLC device receives a UL grant of a cell usable by the corresponding logical channel, it may not participate in the logical channel prioritization process. This operation may be expressed as 'suspend' of the logical channel or the RLC device. Since the corresponding logical channel does not perform uplink transmission, the buffer size, that is, the data volume of the logical channel may be reported as zero to the base station. As a result, the base station does not need to consider the logical channel which reaches the maximum number of retransmissions in the resource allocation.

There is no need to understand that the suspend operation of the logical channel or the RLC device and the operation of reporting the buffer size as zero described in the embodiment of FIG. 17 are applied only if the maximum number of the RLC retransmissions is reached. Even if exceeding a maximum data burst volume (MDBV) to guarantee for a particular logical channel, the terminal may perform the corresponding operation in the same manner. Since data traffic exceeding the maximum data burst volume, which is transmitted, may not guarantee the QoS in the network, it may not be effective for the terminal to quickly transmit data. In so doing, transmitting data belonging to other logical channel first may improve the quality of service performed in the entire terminal. If the data volume transmitted for a specific time window duration reaches the maximum data burst volume, the operations of suspending the logical channel or the RLC device and reporting the buffer size as zero may be conducted.

According to an embodiment, the radio bearer may be configured in both directions of the downlink and the uplink. In this case, it may be necessary to transmit the status report message of the downlink packet transmission. However, if the maximum number of retransmissions is reached in the RLC2 and the RLC device is suspended, the status report message may not be transmitted, because it may not participate in the logical channel prioritization operation. However, since information transfer of the downlink transmission is required, if there is a status report message of the downlink transmission of the RLC device which reaches the maximum number of retransmissions, the corresponding logical channel may participate in the logical channel prioritization process, and the status report message may be transmitted.

If the retransmission of the RLC2 reaches the maximum number of retransmissions and the RLC device is suspended, even though the corresponding RLC device receives the UL grant of the cell usable by the corresponding logical channel, it may not participate in the logical channel prioritization process. That is, since the retransmission reaches the maximum number of retransmissions, the data volume to be transmit substantially by the corresponding logical channel equals to zero. It is necessary to inform the base station of this data volume change to transmit. For doing so, according to an embodiment, if the retransmission of the RLC2 reaches the maximum number of retransmissions, the terminal may trigger a regular buffer status report. If the regular buffer status report is triggered, the terminal may perform a scheduling request operation to transmit the buffer status report message to the base station, or may include the buffer status report message in the MAC PDU.

The methods according to the embodiments described in the claims or the specification of the present disclosure may be implemented in software, hardware, or a combination of hardware and software.

As for the software, a computer-readable storage medium storing one or more programs (software modules) may be provided. One or more programs stored in the computer-readable storage medium may be configured for execution by one or more processors of an electronic device. One or more programs may include instructions for controlling the electronic device to execute the methods according to the embodiments described in the claims or the specification of the present disclosure.

Such a program (software module, software) may be stored to a random access memory, a non-volatile memory including a flash memory, a read only memory (ROM), an electrically erasable programmable ROM (EEPROM), a magnetic disc storage device, a compact disc (CD)-ROM, digital versatile discs (DVDs) or other optical storage devices, and a magnetic cassette. Alternatively, it may be stored to a memory combining part or all of those recording media. A plurality of memories may be included.

Also, the program may be stored in an attachable storage device accessible via a communication network such as Internet, Intranet, local area network (LAN), wide LAN (WLAN), or storage area network (SAN), or a communication network by combining these networks. Such a storage device may access a device which executes an embodiment of the present disclosure through an external port. In addition, a separate storage device on the communication network may access the device which executes an embodiment of the present disclosure.

In the specific embodiments of the present disclosure, the elements included in the present disclosure are expressed in a singular or plural form. However, the singular or plural expression is appropriately selected according to a proposed situation for the convenience of explanation, the present disclosure is not limited to a single element or a plurality of elements, the elements expressed in the plural form may be configured as a single element, and the elements expressed in the singular form may be configured as a plurality of elements.

Meanwhile, while the specific embodiment has been described in the explanations of the present disclosure, it will be noted that various changes may be made therein without departing from the scope of the present disclosure. Thus, the scope of the present disclosure is not limited and defined by the described embodiment and is defined not only the scope of the claims as below but also their equivalents.

The invention claimed is:

1. A method performed by a terminal in a wireless communication system, the method comprising:
   receiving, from a first base station, a first message comprising a first value that provides a first connection for dual connectivity;
   receiving, from a second base station, a second message comprising a second value that provides a second connection for the dual connectivity;
   identifying a bit rate based on the first value and the second value;
   identifying a first buffer size for a first logical channel (LCH) associated with the first connection;
   identifying a second buffer size for a second LCH associated with the second connection; and
   transmitting, to the first base station and the second base station, a buffer status report comprising the first buffer size and the second buffer size,
   wherein, if a number of retransmissions for the second LCH reaches a maximum number of retransmissions, the buffer status report comprises the second buffer size which is set to zero.

2. The method of claim 1, wherein the bit rate is determined to a minimum value of the first value and the second value.

3. The method of claim 1, further comprising:
   communicating with the first base station and the second base station based on the bit rate,
   wherein the bit rate is determined to a value received from a base station defined to a default path of the first value and the second value.

4. A terminal in a wireless communication system, comprising:
   at least one transceiver; and
   at least one processor operably coupled to the at least one transceiver, wherein the at least one processor is configured to:
   receive, from a first base station, a first message comprising a first value that provides a first connection for dual connectivity,
   receive, from a second base station, a second message comprising a second value that provides a second connection for the dual connectivity,
   identify a bit rate based on the first value and the second value,
   identify a first buffer size for a first logical channel (LCH) associated with the first connection,
   identify a second buffer size for a second LCH associated with the second connection, and
   transmit, to the first base station and the second base station, a buffer status report comprising the first buffer size and the second buffer size, and
   wherein, if a number of retransmissions for the second LCH reaches a maximum number of retransmissions, the buffer status report comprises the second buffer size which is set to zero.

5. The terminal of claim 4, wherein the bit rate is determined to a minimum value of the first value and the second value.

6. The terminal of claim 4, wherein the at least one processor is further configured to communicate with the first base station and the second base station based on the bit rate, and
   wherein the bit rate is determined to a value received from a base station defined to a default path of the first value and the second value.

7. A method performed by a first base station in a wireless communication system, the method comprising:
   receiving, from a terminal, a request for a bit rate recommendation;
   transmitting, to the terminal, message comprising a first value that provides a first connection for dual connectivity;
   communicating with the terminal based on a bit rate; and
   receiving, from the terminal, a buffer status report comprising a first buffer size and a second buffer size,
   wherein the first buffer size for a first logical channel (LCH) is associated with the first connection,
   wherein the second buffer size for a second LCH is associated with a second connection for the dual connectivity, and
   wherein, if a number of retransmissions for the second LCH reaches a maximum number of retransmissions, the buffer status report comprises the second buffer size which is set to zero.

8. The method of claim 7, wherein the bit rate is determined by the terminal based on the first value and a second value, and
- wherein the second value of a second base station provides a second connection for the dual connectivity.

9. The method of claim 7, further comprising:
transmitting, to a second base station, the first value, wherein the first value corresponds to the bit rate.

10. The method of claim 7, further comprising:
transmitting, to a second base station, the request for the bit rate recommendation;
receiving, from the second base station, message comprising a second value that provides a second connection for the dual connectivity;
identifying the bit rate based on the first value and the second value; and transmitting, to the second base station, the bit rate.

11. The method of claim 10, wherein the bit rate is determined to a minimum value of the first value and the second value.

\* \* \* \* \*